2 Sheets—Sheet 1.

O. V. FLORA,

Assignor of one-half interest to F. M. C. KENDALL.

Stirrup.

No. 9,244. Reissued June 8, 1880.

WITNESSES

E. S. Nottingham

A. M. Bright

INVENTOR

Orlando V. Flora.

By H. A. Seymour

ATTORNEY

N. PETERS, PHOTO-LITHOGRAPHER, WASHINGTON, D. C.

2 Sheets—Sheet 2.

O. V. FLORA,

Assignor of one-half interest to F. M. C. KENDALL.

Stirrup.

No. 9,244.

Reissued June 8, 1880.

WITNESSES

E. S. Nottingham

A. W. Bright

INVENTOR

Orlando V. Flora

By H. A. Seymour.

ATTORNEY

N. PETERS, PHOTO-LITHOGRAPHER, WASHINGTON, D. C.

UNITED STATES PATENT OFFICE.

ORLANDO V. FLORA, OF MADISON, INDIANA, ASSIGNOR OF ONE-HALF INTEREST TO FRANK M. C. KENDALL.

STIRRUP.

SPECIFICATION forming part of Reissued Letters Patent No. 9,244, dated June 8, 1880.

Original No. 209,117, dated October 22, 1878. Application for reissue filed April 9, 1880.

*To all whom it may concern:*

Be it known that I, ORLANDO V. FLORA, of Madison, Indiana, have invented a new and useful Improvement in Stirrups; and I do hereby declare that the following is a full, clear, and exact description of the invention, which will enable others skilled in the art to which it appertains to make and use the same.

My invention relates more particularly to that class of stirrups which are made of wood steamed and bent into proper form, and are ordinarily known as the "Texas stirrup."

The common method of making this wooden stirrup is to bend the wood into the proper shape, place a block of the necessary form between the jaws, and secure them together by nails and a bolt, which passes through all. The stirrup-strap passes around the aforesaid block. In stirrups of this construction the strain of the rider's weight is entirely upon the bolts and nails, said strain making the use of such stirrups decidedly unsafe to the rider.

My invention consists, first, in the combination, with a strap-block, of a stirrup-body the jaws of which are recessed to receive the ends of said strap-block; second, in the combination, with a stirrup-body having its jaws provided with cylinder-recesses, of a cylindrical strap-block having its extremities fitted loosely in the recesses and adapted to rotate therein; third, in the combination, with a wooden stirrup-body having its jaws provided with inner recesses and with transverse holes communicating with the recesses, of a wooden strap-block provided with a longitudinal hole and having its extremities fitted in the jaw-recesses, said stirrup-body and strap-block being secured together by a bolt which passes through the registering holes thereof; fourth, of a stirrup-body having the inner side of the upper extremities of its jaws formed with cut-away portions, adapting the stirrup to the instep of the foot; fifth, of a stirrup-body having the inner edges of the upper extremities of its jaws made with inclined bearings for the instep of the foot, said bearings being made substantially triangular in form and having the base of the triangle formed at the upper portion thereof.

Figure 1:
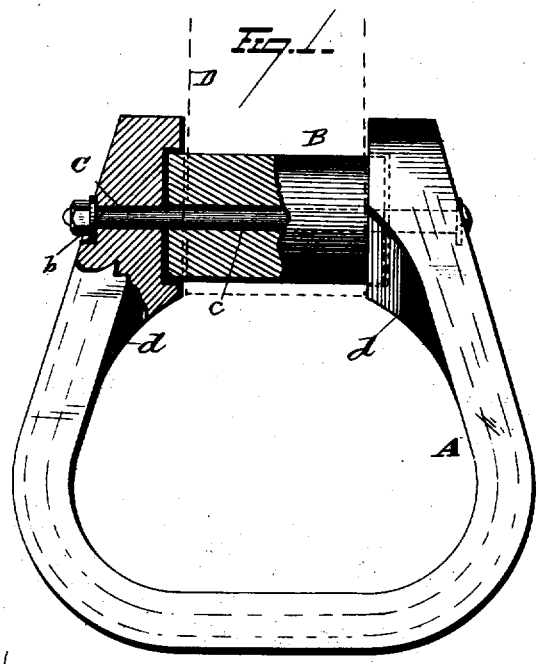
Figure 2:
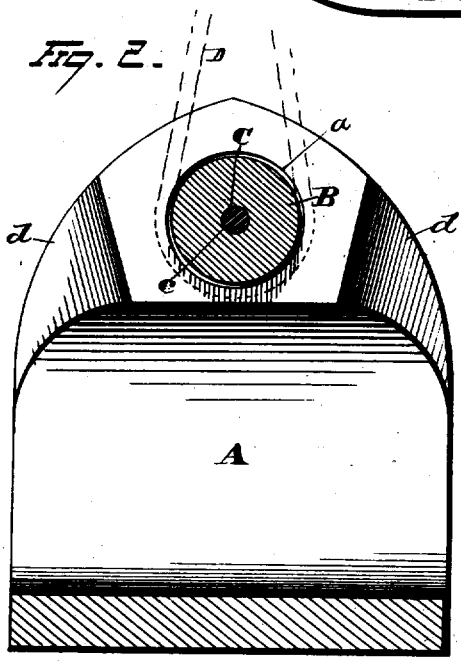
Figure 4:
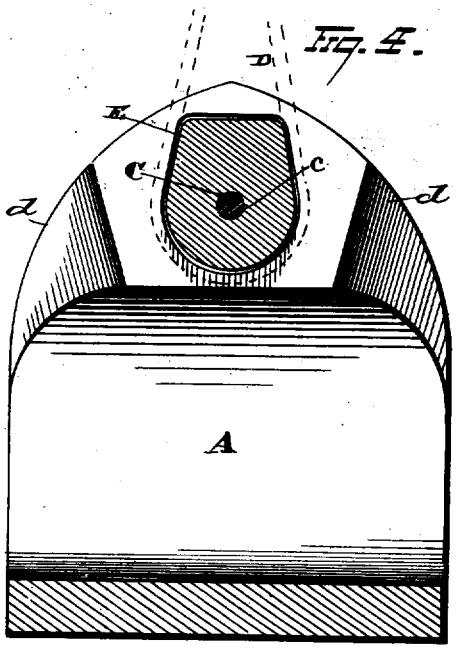
Figure 3:
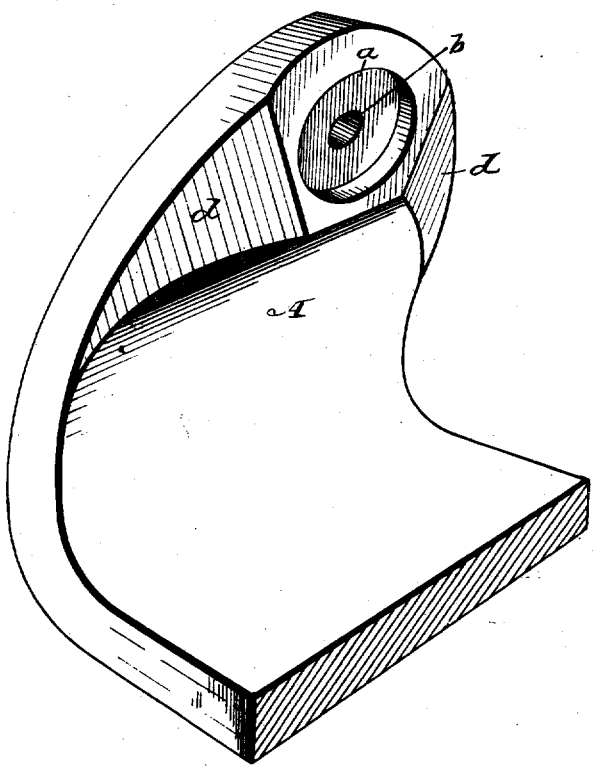

Referring to the drawings, Figure 1 is a broken view, in side elevation, of a stirrup embodying the several features of the invention. Fig. 2 is a vertical sectional view passing transversely through the strap-block, and showing the inner face of one of the jaws. Fig. 3 is a perspective view of the inner side of one of the jaws of the stirrup. Fig. 4 is a view, in inner side elevation, of one of the jaws of a stirrup, illustrating a modification of the invention.

The stirrup-body is made from a piece of plank of suitable form, kerfed on its inner side to allow the proper bend. The inner face of each of the jaws A is formed with a cylindrical recess, *a*, adapted to permit the corresponding end of a cylindrical strap-block, B, to fit loosely therein. Holes *b* pass transversely through the jaws and communicate with the recesses of the latter. A hole, *c*, passes longitudinally through the center of the strap-block and registers with the holes in the jaws as the extremities of the block fit in the jaw-recesses. A bolt, C, fits in these registering-holes, and upon it the strap-block is journaled so as to have free rotary movement in either direction.

The stirrup-strap D fits about the strap-block and turns it without wearing friction upon the strap as the rider readily adjusts his foot in desired position. The nut on the bolt secures the parts together; but it is not tightened up to such a degree as to bind the strap-block by end bearing against the jaw-recesses. The extremity of the strap-block, being housed within said recesses, is enabled to withstand all strain which may be brought thereon. Said strain, being practically in a vertical plane, falls entirely on the recessed bearings and relieves the central bolt from all but a nominal strain.

The sides of the upper portions of the jaws are respectively cut away, so as to provide inclined surfaces *d* on the inner edges of the jaws. These surfaces are formed to fit the instep of the foot, and enable the latter to be supported in the stirrup without causing the instep to come in contact with the edges of the jaws. Each of the inclined surfaces is made substantially of triangular form, the base of the triangle being formed at the upper portion of the jaw. A plane and inclined bearing is thus formed for the instep of the foot, which permits a ready adjustment of the stirrup on the foot and supports the latter easy in the stirrup.

In Fig. 4 of the drawings I show a modification of the strap-block and the recesses in the jaws, said strap-block E being formed angular in transverse section and having its ends housed in corresponding angular recesses in the jaws of the stirrup.

Having fully described my invention, what I claim as new, and desire to secure by Letters Patent, is—

1. In a stirrup, the combination, with a strap-block, of a stirrup-body the jaws of which are recessed to receive the ends of said strap-block, substantially as set forth.

2. In a stirrup, the combination, with a stirrup-body having its jaws provided with cylindrical recesses, of a cylindrical strap-block having its extremities fitted loosely in the recesses and adapted to rotate therein, substantially as set forth.

3. In a stirrup, the combination, with a wooden stirrup-body having its jaws provided with inner recesses and with transverse holes communicating with the recesses, of a wooden strap-block provided with a longitudinal hole and having its extremities fitted in the jaw-recesses, said stirrup-body and strap-block being secured together by a bolt, which passes through the registering holes thereof, substantially as set forth.

4. A stirrup-body having the inner side of the upper extremities of its jaws formed with cut-away portions, adapting the stirrup to the instep of the foot, substantially as set forth.

5. A stirrup-body having the inner edges of the upper extremities of its jaws made with inclined bearings for the instep of the foot, said bearings being made substantially triangular in form and having the base of the triangle formed at the upper portion thereof, substantially as set forth.

In testimony that I claim the foregoing I have hereunto set my hand this 27th day of March, 1880.

ORLANDO V. FLORA.

Witnesses:
T. B. HALL,
E. I. NOTTINGHAM.